Patented Mar. 9, 1954

2,671,733

UNITED STATES PATENT OFFICE 2,671,733

CORK COMPOSITION SURFACE COVERING

William P. Ostermayer, Manheim Township, Lancaster County, Pa., assignor to Armstrong Cork Company, Lancaster, Pa., a corporation of Pennsylvania No Drawing. Application December 14, 1951, Serial No. 261,749

5 Claims. (Cl. 106—200)

This invention relates to a cork composition surface covering and is concerned particularly with the creation of a product having a unique coloring.

At the present time, cork composition is made into tile pieces by one of two processes. In the one, cork granules are charged into a mold, compressed therein, and heated in an oven to cause the natural resinous material in the cork granules to exude therefrom and bind the granules together. The mass is subsequently ejected from the mold, severed into sheets, cut into tile pieces, and appropriately finished either before or after installation. Such a product is used principally as a floor covering. In a second manufacturing procedure, cork granules are coated with a binder such as a phenol-formaldehyde resin. The granules are charged into a mold and compressed therein. Heat is applied to set the binder, and thereafter the mass is removed from the mold, cut into sheets, and subsequently severed into tiles which may be finished in the same manner as the natural resinous bonded material referred to immediately above.

In both of the previous processes the product has been generally either the natural tan color of cork or a darker brown to black color, due to the heating of the cork granules to a temperature where such discoloration occurs. A mottled cork composition is disclosed in Wiley Patent 2,547,989, but this too is limited to colors ranging from the natural tan color of cork to a dark brown or black coloration.

Attempts have been made to obtain colored cork composition by staining the cork granules, but this has been unsuccessful because the stain or dye does not readily penetrate the granules of cork but remains on the surface thereof. As is well known, cork is a truly cellular material and is not porous. As a consequence, applied dyes or stains do not extend to any substantial depth within the body of the granules to which the stain or dye is applied. When such stained or dyed granules are formed into a mass and the mass is severed, the natural tan color of the cork substantially predominates because of the extremely thin layer of coloring composition which outlines the cork granules. The addition of pigments to the binder used in the formation of cork composition has been undertaken, but this too provides a covering in which the coloration is disposed in such thin lines over the cork granules that the tan color of the cork itself substantially predominates, and the desired visual effect is not obtained.

It is an object of the present invention to provide a cork composition surface covering in which a colored effect other than the natural tan coloration may be obtained.

A further object of the invention is to provide a surface covering of the cork composition type in which the characteristic appearance of relatively large severed cork granules is maintained and at the same time a colored appearance is obtained.

Other objects of the invention will become apparent from a consideration of the following description of an embodiment of the invention.

According to the invention, cork composition covering is formed by intermixing a mass of granules of cork consisting essentially of about 80% to 90% of graded size granules larger than about 10 mesh with about 20% to 10% of graded size granules smaller than about 20 mesh. These granules are coated with a thin layer or film of coloring material which is disposed on the surface only of and surrounds substantially all of the granules, and the granules are bonded in close face-to-face contact by a very minor amount of binder, in the order of about 1.2% to about 4.8%, based on the compressed volume of the cork. By such practice, the small cork granules, that is those smaller than about 20 mesh, present an enlarged surface area which is coated with coloring material, and with these small granules interspersed with the larger granules, that is those larger than about 10 mesh, a unique visual effect is obtained, due to the presence of the large surface areas of coloring material which are exposed surrounding the small cork granules as well as the larger cork granules.

A typical example of a cork composition is as follows:

Example

| | Parts by weight |
|---|---|
| ½ inch to 10 mesh cork | 85 |
| 20 to 40 mesh cork | 15 |
| Water dispersion of phenolformaldehyde resin (70% solids) | 7.5 |
| White pigment in water dispersion (40% solids) | 2 |
| Green tinting pigment in water dispersion (20% solids) | 5 |

In preparation of the cork composition, the cork granules are thoroughly intermixed to obtain a random interspersion of the large and small size granules. The pigment paste is then charged into a mixer with the cork granules, and a tumbling action is obtained which distributes the pigment paste substantially uniformly over the surface of all of the cork granules. It will be noted that the total of the pigments represents about 2% of the weight of the cork. Preferred practice is to use between about 1% and 5% of pigment based on the weight of the cork. In place of pigment, light fast dyes may be employed. The white pigment is preferably titanium dioxide having a high reflectivity. This is desirable, for cork has low light reflectivity; and, where a brilliant coloring is desired, the high brilliancy titanium dioxide should constitute a substantial portion of the pigment. The tinting pigment will be chosen in accordance with the color desired in the final product.

Subsequent to the distribution of the pigment over the cork granules, the binder is added to the mixer and is distributed uniformly over all of the pigment-coated cork granules. While a phenol-formaldehyde resin is preferred, other binders such as the shellac, cellulose acetate or nitrate, glue, albumen, urea formaldehyde, resorcinol formaldehyde, and casein binders disclosed in the Wiley patent may be used. The present invention is not directed to any particular binder, and practically all binders may be used. For most purposes, a light colored transparent binder is preferred. The quantity of binder employed is very small, and this is important in the attainment of the desired visual effect. In the example given above, the resin binder constitutes about 1.9% of the volume of the compressed cork. For best results, the quantity of binder should be in the range of about 1.2% and 4.8%, based on the compressed cork volume.

In the example given above the cork component consists essentially of 85% of graded size granules of ½ inch to 10 mesh cork and 15% of 20 to 40 mesh cork. As is well known in the cork industry, ½ inch to 10 mesh cork consists essentially of granules which will pass through a ½ inch screen and which will all be retained on a 10 mesh screen. All screens referred to herein are of U. S. Standard classification. Cork granules of a size somewhat larger than ½ inch may be included for certain visual effects, such as ⅝ inch to 10 mesh granules. It is also possible to obtain unique effects by employing granules of ½ inch to 5 mesh size. In order to obtain the desired effect it is essential, however, there be at least about 80% to 90% graded size granules larger than about 10 mesh.

There should be incorporated in the cork component a substantial quantity of relatively fine cork granules. These should represent at least about 10% and not more than about 20% of the total cork component and should be of a size smaller than about 20 mesh. The mesh size may range down to 40 or lower, but especially good results are obtained with from 10% to 20% of 20 to 40 mesh granules.

It will be observed that there are substantially no granules of intermediate size, that is, between the minimum of 10 mesh for the large granules and the maximum of 20 mesh for the small granules. Thus the small granules when coated with the coloring material tend to impart color to the mass, while the large granules impart the desired cork "character" to the mass, and there is no substantial merging of the one class of components into the other which would affect the desired visual appearance of the finished product.

In the formation of the cork composition the pigment-coated granules having a thin film of binder on all of their exposed surfaces are charged into a mold and compressed therein. The degree of compression will vary, depending upon the nature of the product to be produced, the size of the granules, and other variable factors. For wall covering use with the formulation of the example above, a compression of about 3½ volumes to 1 will be acceptable. The mass confined in the mold is then heated to set the binder, and subsequently the mass is removed from the mold. With conventional baking practice, the composition of the example may be cured at 220° F. to 260° F. for about six to fourteen hours, depending upon the temperature of baking. Subsequent to baking, it is preferred to cool the material in the mold in order to avoid any objectionable swelling of the mass. After the mass has been removed from the mold it may be severed or split into sheets, and the sheets may be cut into smaller units, such as 6" x 6", 9" x 9", 12" x 12", and 12" x 24" units of appropriate thickness such as ⅛", ³⁄₁₆", or ¼". The sheets may be grooved on the surface in block or tile designs; or, for some uses, such as for furniture coverings, the plain sheets may be employed. The surface is then preferably sanded, and a finishing coat of wax or other material may be applied. Where the material is for use as a floor covering, the sanding and finishing operations may be effected subsequent to installation of the material upon the floor.

While reference has been made to the incorporation of the pigment paste on the granules of cork prior to the addition of the binder, the binder may be added first, and the pigment subsequently distributed over the binder-coated granules, or the binder and pigments may be applied simultaneously or in admixture, or a portion of the pigment may be applied with or without the binder and subsequent mixing effected with incremental addition of pigment or pigment and binder. Since coloration is effected essentially by coating of the smaller granules, it is necessary that at least substantially all of the smaller granules be coated with coloring material. It is preferred, however, to apply the coloring material to substantially all of the cork granules. The particular order of incorporation of ingredients is not essential to the practice of the invention.

I claim:

1. A cork composition surface covering comprising: a sheet severed from a compressed mass of granules of cork consisting essentially of about 80% to 90% of graded size cork granules larger than about 10 mesh intermixed with about 20% to 10% of graded size cork granules smaller than about 20 mesh, said cork component being substantially free of granules of intermediate size, between 10 and 20 mesh; a thin coating of coloring material disposed on the surface only of and surrounding at least substantially all of said granules smaller than about 20 mesh; and about 1.2% to about 4.8%, based on the compressed volume of the cork, of a binder joining said granules together under compression and in close face-to-face contact.

2. A cork composition surface covering comprising: a sheet severed from a compressed mass of granules of cork consisting essentially of about 80% to 90% of granules of cork of graded size of about 10 mesh to ½ inch mesh intermixed with about 20% to 10% of granules of cork of graded size of about 20 mesh to 40 mesh; a thin coating of coloring material disposed on the surface only of and surrounding substantially all of the granules; and about 1.2% to about 4.8%, based on the compressed volume of the cork, of a binder joining said granules together under compression and in close face-to-face contact.

3. A cork composition surface covering in accordance with claim 2 in which the coloring material is pigment and in which the cork component is substantially free of granules of intermediate size, between 10 and 20 mesh.

4. A cork composition surface covering in accordance with claim 3 in which the pigment includes titanium dioxide and tinting pigment.

5. A cork composition surface covering in accordance with claim 1 in which the coloring material is light fast dye.

WILLIAM P. OSTERMAYER.

References Cited in the file of this patent

UNITED STATES PATENTS

| Number | Name | Date |
|---|---|---|
| 1,271,015 | Campbell | July 2, 1918 |
| 1,437,155 | Schulz | Nov. 28, 1922 |
| 1,890,128 | Rile | Dec. 6, 1932 |
| 2,104,692 | Cooke | Jan. 4, 1938 |
| 2,547,989 | Wiley | Apr. 10, 1951 |